United States Patent
Shenshev

[15] 3,703,602
[45] Nov. 21, 1972

[54] MACHINE FOR TEACHING FOREIGN LANGUAGES

[72] Inventor: Leonid Valdimirovich Shenshev, prospekt, 88, Korpus 3, kv. I26, Moscow, Leninsky, U.S.S.R.

[22] Filed: Nov. 4, 1970

[21] Appl. No.: 86,859

[52] U.S. Cl. .................................................35/35 C
[51] Int. Cl. ...............................................G09b 5/04
[58] Field of Search..35/35 C; 179/1 SA, 1 SB, 1 VS, 179/100.2 MD, 100.2 Z

[56] References Cited

UNITED STATES PATENTS

| | | | |
|---|---|---|---|
| 3,020,360 | 2/1962 | Gratian et al. | 35/35 C X |
| 3,141,069 | 7/1964 | Withey | 179/1 SA X |
| 3,175,038 | 3/1965 | Mauch | 179/1 SA |
| 3,269,033 | 8/1966 | Redfield et al. | 35/35 C |
| 3,287,830 | 11/1966 | Fleury et al. | 35/35 C |

Primary Examiner—Wm. H. Grieb
Attorney—Holman & Stern

[57] ABSTRACT

A machine for teaching foreign languages, comprising a multichannel magnetic sound recorder with a tape loop carrying pre-recorded fragments of speech and control signals, and students' terminals connectable to the channels of said magnetic sound recorder to synthesize various phrases from the pre-recorded speech fragments, each of said terminals comprising: an acoustic output unit; a phrase shaper incorporating multiple switches; a pause shaper to substitute pauses for various combinations of the fragments of a phrase, said pause shaper being connected to said phrase shaper; a shaper unit for automatic written translation of the oral speech being synthesized, said unit being connected to the phrase shaper and to the pause shaper. The machine enables students to adapt to their personal peculiarities in a versatile manner the form, content and degree of difficulty of the oral exercises being performed.

12 Claims, 12 Drawing Figures

MACHINE FOR TEACHING FOREIGN LANGUAGES

This invention relates to machines for teaching foreign languages. At present, a number of major technical difficulties hinder the cardinal advance of the process of teaching foreign languages, the difficulties being mainly caused by the following contradiction: on the one hand, a more flexible individualization of the audio-visual information given to students is needed, and on the other hand, in order to cut the expenditures on audio-visual machines certain devices are required capable of giving audio-visual information simultaneously to a greater number of students. At present, these two requirements are incompatible with each other. And more so, since the first of these, by itself, gives rise to a contradictory problem, namely, in order not to limit the individual strategy of teaching the capacity of the memory of the audio-visual machine should ideally strive for infinity, whereas the time of selection from the memory of any audio-visual frames stored in it should be close to zero, for the specific nature of a foreign language as a subject to be studied requires a greater frequency of the students' contact with the device they are being taught by.

A number of ways are known to solve the above major difficulties.

Known in the present state of the art are machines for teaching foreign languages, comprising a magnetic sound recorder with a multitrack magnetic tape loop, wherein selection of a desired sound track of the magnetic tape loop (hereinafter referred to as magneloop) is due to shifting the sound-reproduction (playback) head; besides, due to the provision of a gear train, the carrier of the graphic illustrations is automatically moved against the screen for a corresponding number of frames.

Such devices enable an arbitrary sequence of the frame selection and involve no keyboard manipulations by the students for a multiple relistening to the sound accompaniment of the selected frame. However, the replaceable stock of frames therein is restricted to the number of tracks in a tapeloop, i.e., is not in excess of 10–20 frames, which fact practically hampers the possibility of teaching by branching programs.

Furthermore, inasmuch as every frame selection involves shifting of the magnetic head, such a machine fails to simultaneously service a number of students that learn the material being taught at different rates.

There are likewise known machines for teaching foreign languages comprising a multichannel magnetic sound recorder with a tape loop, said recorder being adapted to communicate with a few individual students' terminals. Such machines incorporate a 28-channel magneloop recorder and 16 individual students' terminals. 12 tracks of the magneloop carry respectively 12 pre-recorded master messages, while the other 16 tracks are used for an automatic recording and automatic reproduction of the speech of each of sixteen students. A students' terminal comprises a microphone, an acoustic output unit and a twelve-point switch which is instrumental in connecting the acoustic output unit to any of the twelve channels of said recorder. In virtue of the magnetic tape being a continuous (endless) loop, each mentioned master message is continuously recycled in every twelve channels mentioned above. In such a device the changeable stock of frames carrying instructional information is likewise extremely scarce equalling to as small as 12 frames. This fact compels the compilers of instructional programs to incorporate at once several phrases in one audio frame, which adversely affects the efficacy of the teaching process. Another essential disadvantage of the afore-described device resides in the fact that the number of students serviced thereby cannot be in excess of the number of channels allotted in the tape recorder for recording and playing back the students' responses.

Some linguaphone systems are also known, wherein the number of the simultaneously serviced individual desks exceeds that of the channels available in a magnetic tape recorder for recording and reproducing the students' speech. A disadvantage inherent in such systems lies with that an automatic distribution of said channels between the students is effected by means of a clockwork, without taking into account the kind of learning task which is being performed by some student or other.

Some machines for teaching foreign languages are known to function by the method of automatic synthesis of oral speech at the outputs of a multichannel tapeloop sound recorder (USSR Author's Certificate No. 195725). According to said method fragments of speech are recorded on a magnetic tape in such a manner that each intonationally complete fragment of a phrase be continuously and cyclically iterated at a respective recorder output with practically zero pauses. The outputs of the recorder are connected to a switchboard, which makes it possible for each of the students to be serviced simultaneously, to compile (independently of the other students) from fragments some message unit or the other which has not preliminarily been recorded on the magnetic tape. However, such machines fail to ensure a fully automated synthesis of the assigned phrases without having recourse to an all-purpose computer or any special-purpose control computing machine, with the result that the system becomes relatively bulky and expensive. Another disadvantage of the abovesaid method consists in that it fails to avoid the synthesis of meaningless phrases which results in a complicated control program of the process of synthesis. Furthermore, such machines are intrinsically incompatible with the existing methods of sound-image synchronization, this being due to the fact that in an automatic synthesis of oral messages the waiting time is equal to almost zero and does not depend upon the storage capacity of the corresponding memory unit, whereas in the abovementioned devices for a visual display or exposure of graphic illustrations (pictures) the access time is in direct proportionality with the storage capacity.

It is an object of the present invention to provide a machine for teaching foreign languages whose storage capacity would amount to thousands of audio-visual frames with random access to each of them by any of the simultaneously serviced students at an average waiting time of 1–2 sec.

It is another object of the present invention to provide a machine of the character set forth hereinabove which would enable students to adapt in a versatile manner to their personal features the form, content

FIG. 12 a, b, c, d, e illustrates sections of disks with visual information fragments to be displayed.

Figure 1:
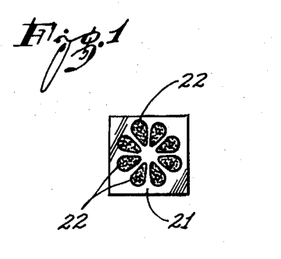
FIG. 1 represents a block-diagram of a machine for teaching foreign languages, according to the invention.

Now referring to the drawings, the device for teaching foreign languages comprises a master multichannel magnetic sound recorder 1 with a magnetic tape loop which carries pre-recorded speech and control signals, an auxiliary multi-channel magnetic sound recorder 2 with a magnetic tape loop for automatic recording and automatic reproduction of the students' speech, and students' terminals 3.

The students' terminals 3 are connected in parallel to two groups of the acoustic channels of the magnetic sound recorder 1 through communication lines 4 and 5, to the outputs of a decoder 6 connected with the magnetic sound recorder 1 through a register 7, to the outputs of a decoder 8 connected to the magnetic sound recorder 1 through a register 9, and to the outputs of an amplifier unit 10 connected to a power supply unit 11 of the signal lamps and to a group of the channels of the magnetic sound recorder 1. Each of the groups of the channels of the magnetic sound recorder 1 comprises "S" channels. The decoders 6 and 8 incorporate each "Q" outputs. The unit 10 is connected to "S" channels of the magnetic sound recorder and has "S" outputs.

The terminals 3 are associated into groups by electric circuits 12, each of such groups incorporating "M" terminals and being connected through the circuits 12 to a respective group of channels of the magnetic sound recorder 2, said group of channels containing "N" recording and reproducing channels, where N<M.

In each terminal 3 (FIG. 2) the communication lines 4 and 5 are connected respectively to phrase shapers 13 and 14 which are connected to each other and to a selector 15 of the phrase shapers. The selector 15 is connected to an acoustic output unit 16 and is coupled to a regulator 17 of the accessibility of the channels of the auxiliary recorder 2. The acoustic output unit 16, the regulator 17 of the auxiliary recorder accessibility and a microphone 18 are all connected to the circuits 12.

Figure 2:
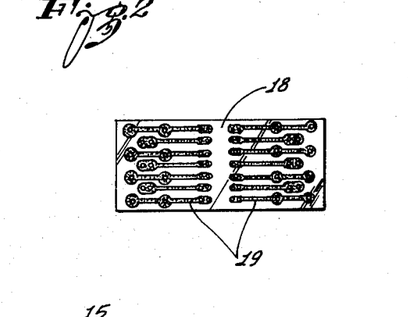
FIG. 2 illustrates a block-diagram of a student's terminal, according to the invention.

The outputs of the decoders 6 and 8 are connected to a pause shaper 19 which is associated with the phrase shapers 13 and 14, with the regulator 17, with a converter unit 20 for transforming the rhythm of the speech being synthetized into a form suitable for being observed visually, said converter unit being connected to a signal lamp 21, and with a unit 22 for automatic shaping the written translations of the oral speech being synthetized, said unit being connected also to the phrase shapers 13 and 14 and to the selector unit 15.

The phrase shapers 13 and 14 and the unit 20 comprise each a number of multiple switches. For the sake of concreteness and definiteness, in FIG. 3 there are assumed: Q = 4 and S= 3, where Q denotes the number of S-point switches. Each of the switches 23–26 of the phrase shaper has S inputs and is connected in parallel with S channels of one of the groups of channels of the magnetic sound recorder 1 through the communication line 4. Each of the switches 27–30 of the converter unit for visualizing the rhythm of the speech being synthetized, has likewise S inputs and is connected in parallel to S output channels of the unit 10. Each of the switches 31–34 of the other phrase shaper has likewise S inputs and is connected in parallel with S channels of the other group of channels of the magnetic sound recorder 1.

Figure 4:
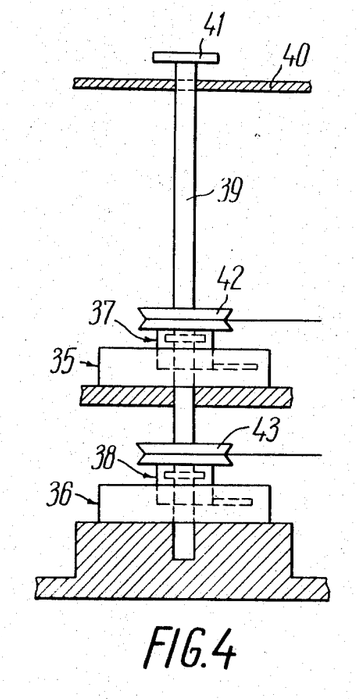
FIG. 4 and FIG. 5 represent an embodiment of a shaper unit of the written translations of the oral speech being synthetized, according to the present invention.

The switches 23–34 are banked into Q groups each incorporating three switches. One of said groups is made up, say, by the switches 23, 27 and 31. Constructionally, each of said groups of switches is made as a wafer switch having three wafer plates. Each pair of wafer switches 35 and 36 (FIG. 4) is driven from a common shaft 39 through two ratchet mechanisms 37 and 38 adapted to operate when rotated in opposite directions, said shaft 39 passing through the lid 40 of the terminal 3 and being provided with a frame selector handle 41. The ratchet mechanisms 37 and 38 are associated with respective drive pulleys 42 and 43 to each of which there corresponds in the written-translations shaper unit 22 a certain driven pulley 44 (FIG. 5) set on one of coaxial bushings 45 fixed in position on a common shaft by means of attachments 46 and provided with stepwise arranged holders 47 for changeable graphic information carriers made as transparent disks.

Figure 6:
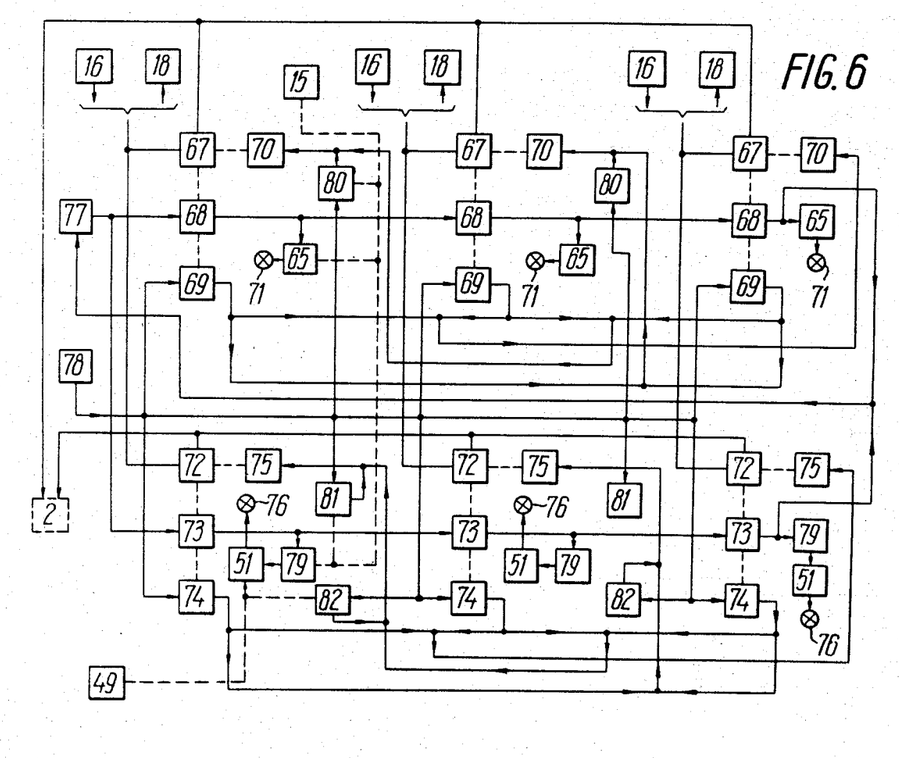
FIG. 6 shows a block-diagram of a group of the students' terminals, according to the invention.

The pause shaper 19 (FIG. 2) is made as two mechanically interlinked multiple switches 48 and 49 (FIG. 3) which actuate cam interruptors 50 (FIG. 3) and 51 (FIG. 6). The inputs of the switch 48 (FIG. 3) are connected to the output channels of the decoder 6 while the switches 49 are coupled to the output channels of the decoder 8. The switches 48 and 49 are made so that when in any of their positions they connect with the respective output channels of the decoders 6 and 8 a definite combination of relays 52–59 provided at the outputs of the switches 23–26 and 31–34. At the output of the switches 27–30 there are provided interruptors 60–63 made as another pair of contacts of the relays 52–55 and coupled to the indicator lamp 21.

Figure 3:
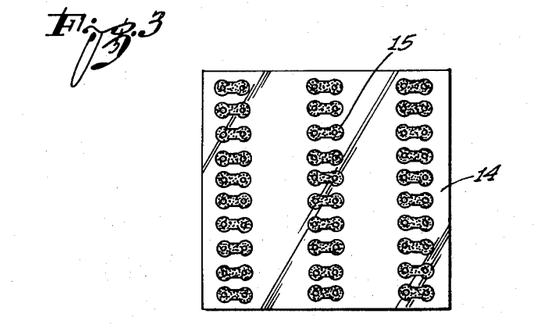
FIG. 3 shows a block-diagram of phrase- and pause-shapers, according to the invention.
Figure 5:
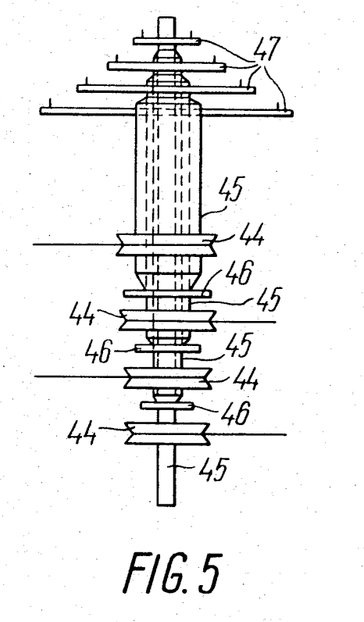

The shaft of the selector unit 15 transmits motion to one of the holders 47 for changeable graphic information carriers and to cam interruptors 64 and 65 (FIGS. 3, 5 and 6). A toggle switch 66 is connected in parallel with the cam interruptor 64 (FIG. 3), the latter being connected to the output circuit of the phrase shaper in parallel with the cam interruptor 50.

TABLE 1

| | $t_1$ | $t_2$ | $t_3$ | $t_4$ | $t_5$ | $t_6$ | $t_7$ | $t_8$ | $t_9$ | $t_{10}$ | $t_{11}$ |
|---|---|---|---|---|---|---|---|---|---|---|---|
| II | Haben sie | die | am Montag | eingelaufenen | | Briefe | nicht übersetzen lassen | dann muß man sich beeilen | | | |
| III | Haben sie | die | am Dienstag | abzusendenden | | Vorträge | noch nicht übersetzt | Nein | | | |
| IV | Hat sie | die | am Freitag | zu besprechenden | | Papiere | noch nicht gelesen | Doch | | | |
| | поступившие | в понедельник | | | то нужно торопиться | | Вы не отдали перевести | письма | | | |
| | отсылаемые | во вторник | | | Нет (в смысле "Вы правы"). | | Они еще не перевели | доклады | | | |
| | обсуждаемые | в пятницу | | | Нет (в смысле "ошибаетесь"). | | Она еще не прочитала | бумаги | | | |
| | | | | | Если | | | | | | |

In the course of a uniform movement of the tape loop a corresponding German phrase or dialog is being uninterruptedly recycled in each of the three channels of the first group of channels of the magnetic sound recorder 1, whereas a respective Russian text is being continuously recycled in each of the three channels of the second group of channels. In each of the terminals 3 the German text is continuously and cyclically arriving at the inputs of the phrase shaper 13, while the Russian text, at the inputs of the phrase shaper 14. At the first of the three inputs of each of the three-point switches 31–34 there is continuously and cyclically arriving the Russian sentence: "If you have not had translated the letters that had been received on Monday, You must make haste." At the same time arriving at the second input of each of said switches is the dialog: "Have they not yet translated the reports that will be sent on Tuesday?" — "No, they have not," and at the third input of each of said switches there is arriving the dialog: "Has she not yet read the papers that will be discussed on Friday?" — "Yes, she has." The corresponding German sentences and dialogs are arriving at the same time at the respective inputs of each of the three-point switches 23–26.

The codes of the control signals recorded on the first track, are delivered from the decoder 6 in each of the students' terminals 3 to the inputs of the multiple switch 48 of the pause shaper which switch, depending on the position assumed by it, can cancel some of the control signals and leave open the contacts of the corresponding interruptors 52–55 in the terminal involved. In response to the command "I" the normally open contacts 52 close, in response to the command "II" the normally open contacts 53 do so, in response to the command "III" the normally open contacts 54 do so and in response to the command "IV" the normally open contacts 55 do so, all this being the case should the commands I–IV pass through the switch 48.

Assume the pause shaper switch 48 to be in zero position, where it does not block any of the decoder output channels, and the selector unit 15 to be in such a position where it connects the student's headphones 16 with the output of the phrase shaper 13, i.e., to the common output of the switches 23–26.

When all the five switches of the phrase shaper involved are set to the first position it is the phrase recorded on the second track that will be cyclically delivered to the student's headphones. When all the switches are set to the second position this results in that the dialog recorded on the third track will be cyclically delivered to the student's headphones. With said switches set in the third position, the phrase recorded on the fourth track will be cyclically delivered to the student's headphones. Should, however, the position assumed by solely one switch differ from the positions assumed by the other switches, this results in that cyclically delivered to the student's headphones will be a phrase or dialog not stored on the tapeloop. For example, with the switch 23 in the third position, the switch 24 in the first position, the switch 25 in the third position, the switch 26 in the second position, and the fifth switch (not shown in the drawing) in the second position, the following dialog will be cyclically delivered to the headphones of a student working with the terminal involved: "HAT SIE DIE AM FREITAG ABZUSENDENDEN BRIEFE NOCH NICHT GELESEN? — NEIN."

The phrase shaper, comprising "Q" "S"-point switches is capable of shaping $\Phi = S^Q$ phrases or dialogs. In the simplified example considered herein there are assumed S=3, Q=5, whence $\Phi = 3^5 = 243$ for the given particular case.

The commands recorded on the fifth track are passed through the decoder 8 in each of the students' terminals 3 to arrive at the inputs of the pause shaper switch 49 and from its outputs, at the respective interruptors 56–59 of the second phrase shaper. Inasmuch as the switches 23 and 31, 24 and 32, and so on, are pairwise interconnected through a rigid mechanical linkage, the switches within each of said pairs may assume but the same position. Hence, whichever of the $3^5 = 243$ German phrases and dialogs is synthesized by the first phrase shaper the second phrase shaper of the terminal is at the same time to synthesize the translation of that phrase into Russian.

In order to pass from one language to the other (e.g., when performing a retranslation exercise) it will suffice for the student to merely turn the knob 82 of the selector unit 15 (FIG. 7) through one position.

To partially change the content of the text it will suffice for the student to merely turn even through one step one of the frame selector knobs 41. If turned clockwise, said knob changes the position of the switches 24 and 32 with the immediate result that the content of the visual frame displayed on the screen 84 gets changed accordingly. At the student's will the appearance of a picture may be retarded by turning out the toggle switch 85 of the screen illumination lamp.

Figure 10:
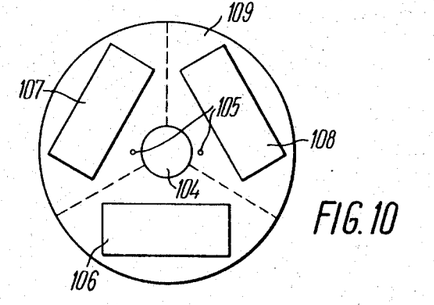
FIG. 10 is an embodiment of disks in the automatic written-translation shaper unit, according to the invention.
Figure 12:
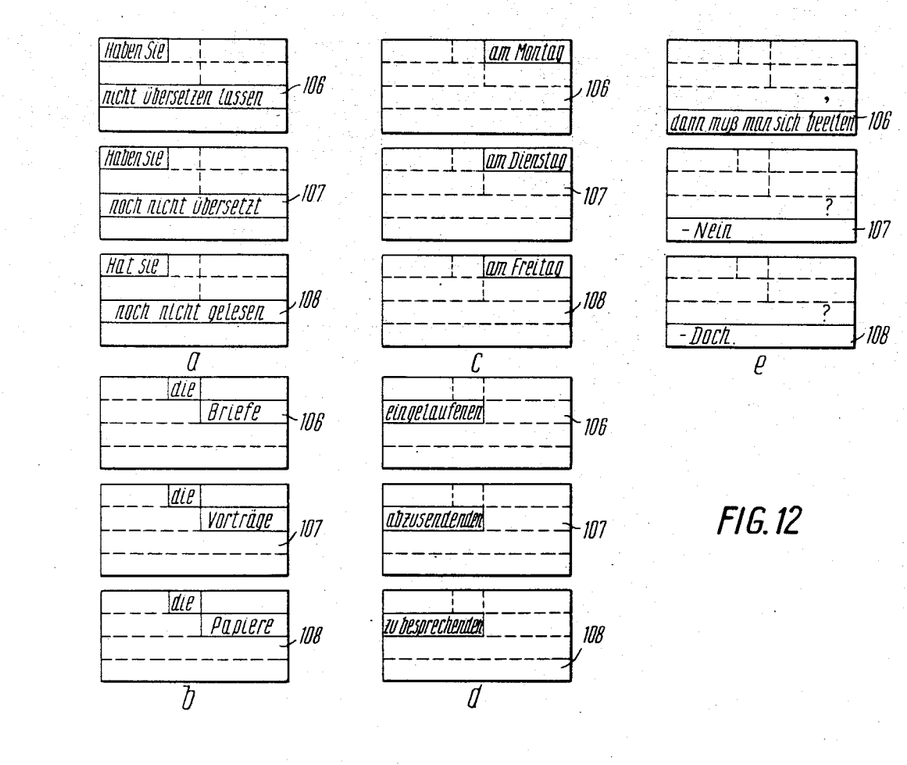

A synchronous formation of the graphic illustrations of the automatically synthesized oral speech, in particular, an automatic shaping of its written translations, is effected due to the fact that the handles 41 actuate not only the switches 23–26 and 31–34 (FIG. 3) of the phrase shapers, but at the same time the coaxial bushings 45 (FIG. 5) carrying the holders 47 for the graphic information changeable carriers made as transparent disks 109 (FIG. 10). In the herein-considered particular example there are needed five disks for an automatic shaping of the written translations of the Russian speech into German. Each of said disks is divided into three sectors 120° each, wherein rectangles 106–108 are singled out, each of said rectangles corresponding in projection to the screen 84. The arrangement diagram of the graphic information in said rectangles are represented in FIG. 12. The vacant portions of the rectangles are left transparent. The rectangles 106–108 illustrated in FIG. 12a, are arranged in the respective sectors of the disk that is turnable at 120° round the respective bushing 45 (FIG. 5) when the switches 23 and 31 (FIG. 3) are turned through one step. The rectangles 106–108 shown in FIG. 12b, are arranged in the corresponding sectors of the disk whose position depends upon the position assumed by the switches 24 and 32. The rectangles 106–108 represented in FIG. 12c, are arranged in the corresponding sectors of the disk whose position is determined by the position of the switches 25 and 33. The rectangles 106–108 appearing in FIG. 12d, are arranged in the respective sectors of the disk whose position depends upon the position of the switches 26 and 34. The rectangles 106–108 shown in FIG. 12e, are arranged in the respective sectors of the disk whose position is determined by the not represented in FIG. 3 fifth switches of the phrase shapers. For each fixed position of the bushings 45 (FIG. 5) the rectangles 106–108 (FIG. 10) of the bottom disk 109 serve as a background for the rectangles 106–108 of all the superjacent disks 109. An image is formed by superposing on the screen all the five rectangles occurring against the screen at a time (one rectangle from each disk). The disks are engaged by the holders 47 of the bushings 45 in such a way that the rectangle 106 of the disk driven by the shaft of the switches 23 and 31, occurs to be against the screen at the moment when said switches assume their first position; that the rectangle 106 of the disk driven by the shaft of the switches 24 and 32 occurs to be against the screen when said switches assume their first position, and so on.

When synthesizing, say, the oral text (in Russian): "Has she not yet read the reports that had been received on Monday? — Yes, she has," there occur beneath the screen at a time: the rectangle 108 of FIG. 12a, the rectangle 107 of FIG. 12b, the rectangle 106 of FIG. 12c, the rectangle 106 of FIG. 12d and the rectangle 108 of FIG. 12e with the result that there appears on the screen the text: "HAT SIE DIE AM MONTAG EINGELAUFENEN VORTRAGE NOCH NICHT GELESEN?," — DOCH." Having turned the handle of the selector unit 15 through one step the student hears in his/her headphones the above dialog in German instead of the original dialog in the mother tongue.

If during the execution of audition exercises (audio recognition) one or the other of the 243 German phrases or dialogs renders to be difficult to translate by the student, he/she may utilize the pause shaper control handle 87. In each of its positions except for the zero one, the pause shaper cancels from the phrase or dialog being synthesized, a definite combination of the fragments thereof, thereby simplifying the structure and rate of speech.

For instance, with the pause shaper (i.e., the switches 48 and 49 FIG. 3) set to a position where it will block the commands "III," "IV" and "V" (refer to Table 1), the student will hear instead of the above-stated dialog the following: "HAT SIE DIE (a pause) VORTRAGE NOCH NICHT GELESEN'," that is, the phrase whose structure is simplified at the expense of cancellation of the minor parts thereof. Having turned the selector unit 15 through a step, the student hears an oral translation of just the abovementioned simplified version of the dialog and, having turned on the screen illumination toggle switch 85, the student sees a written translation of the same simplified version of the dialog.

Figure 11:
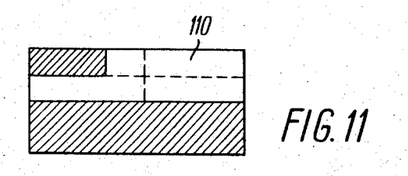
FIG. 11 shows a section of the slitted film strip.

Simplification of the structure of a graphic frame is attained due to the fact that to each of the positions of the pause shaper control handle 87 (FIG. 7) there corresponds a definite frame of the film strip 90. In each of the frames of said frame slits 110 (FIG. 11) are so arranged as to display information, stored only on those disks that correspond to the control signals passed through the pause shaper. For instance, when the pause shaper is in a position, wherein the commands "I" and "V" are blocked (see Table 1), the slit 110 (FIG. 11) in a respective frame of the film strip is made so as it is shown in FIG. 11. In that case the rectangles of the disks that are shown in FIG. 12a, are not displayed, i.e., with the above-stated dialog selected, there will be displayed on the screen only: "DIE AM MONTAG EINGELAUFENEN VORTRAGE," and there will be heard in the student's headphones (depending upon the position of the language selector unit) either the abovementioned German text cyclically repeated with some pauses, or the same text in Russian likewise cyclically repeated with some pauses.

Upon arrival of control signals recorded on the ninth, tenth and eleventh tracks of the tapeloop of the magnetic sound recorder 1, there operate in the amplifier unit 10 the interruptors of the respective three power supply circuits of the indicator lamp 21 provided in each of the students' terminals 3. Control signals for said lamps are so recorded on the tape, that current pulsation in the circuit controlled by the signals recorded on the ninth track, synchronously represents the rhythm of a phrase recorded on the second track, current pulsation in the circuit controlled by the signals recorded on the tenth track, synchronously represents the rhythm of a phrase recorded on the third track, and current pulsation in the circuit controlled by the signals recorded on the eleventh track, synchronously represents the rhythm of a phrase recorded on the fourth track.

Assume the student to have selected on his/her terminal the work combination "AM MONTAG," i.e., to have set the pause shaper to the position, wherein there are blocked all the commands except for the command "III" which controls the interruptors 54 and 58, and to have set the wafer switch comprising the switches 25 and 33, to the first position. Inasmuch as the switch 29 is made as one of the wafer plates of said wafer switch, the interruptor 62 gets communicated with that power supply circuit of the lamp 21 which is controlled by the signals recorded on the ninth magneloop track. As said interruptor is made as the second pair of contacts of the interruptor 54, it closes the power supply circuit of the lamp 21 only for a lapse of time during which the acoustic output unit 16 is delivering the word combination "AM MONTAG." To represent the rhythm of said word combination the lamp 21 first gives a shorter flash followed by a longer one. Since with the given position of the pause shaper all the remainder interruptors 60, 61 and 63 are inoperative, the lamp 21 during the pauses will be inoperative accordingly.

Figure 7:
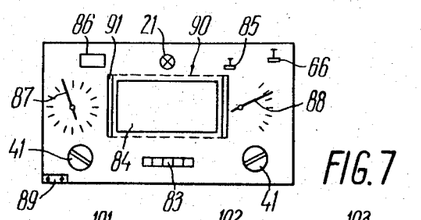
FIG. 7 illustrates an embodiment of the panel of a terminal, according to the invention.
Figure 8:
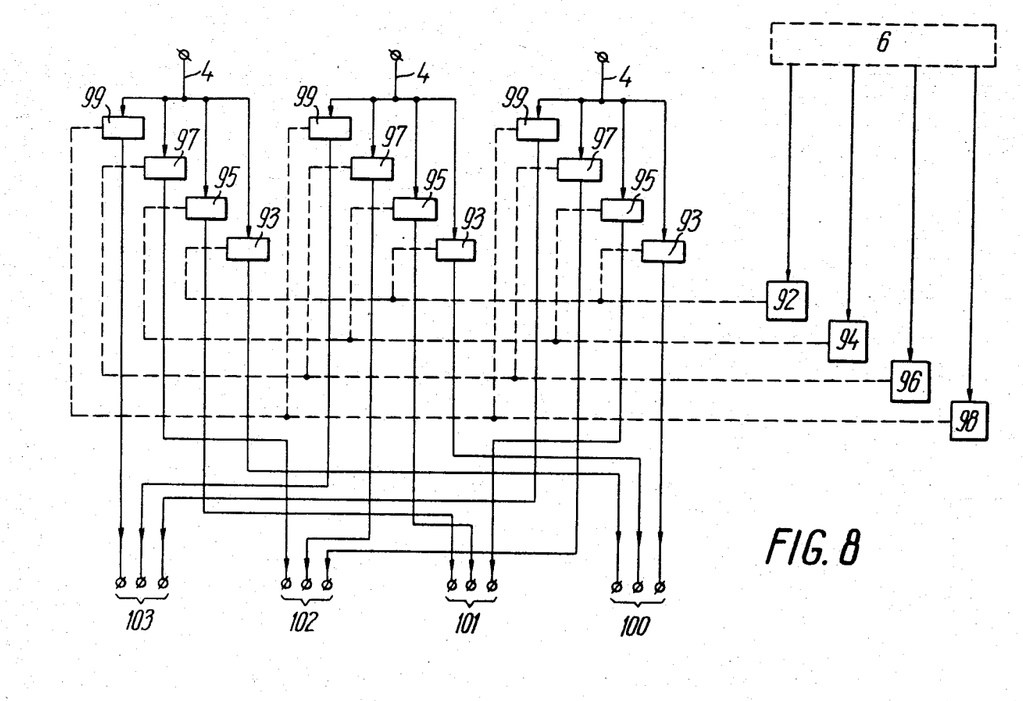
FIG. 8 shows one of the embodiments of the method of communication of the master magnetic sound recorder with the terminals, according to the invention.
Figure 9:
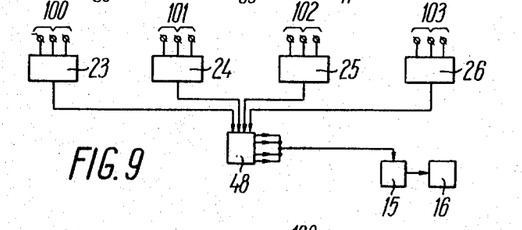
FIG. 9 represents one of the embodiments of the method of connection of a pause shaper to a phrase shaper, according to the invention.

Now assume that during the pauses between the cyclically repeated word combination "AM MONTAG" the student repeats this speech fragment aloud and wants to compare his/her own pronunciation with that of the German speaker. For this it will suffice to actuate one of the illuminated keys 83 (FIG. 7). Suppose the student has actuated the key of the first recording and reproducing channel of the auxiliary magnetic sound recorder, that is the key with the contacts 67, 68 and 69 (FIG. 6). By making the contact 67 will connect the acoustic output unit 16 and the microphone 18 of the given desk with the first channel for the recording and reproduction of the students' speech. The contact 68 will interrupt the power supply circuit of all the lamps 71, that is, the first key will be no longer illuminated on all the terminals of the given group. The contacts 69 will cause operation of the unit 70 in the remaining terminals of the given group, so that the same key in these terminals will be not only no longer illuminated but also mechanically blocked.

Should the student wish to record and reproduce his/her own speech while he/she listens to a fragment of speech in his/her mother tongue coming from the master magnetic sound recorder to his/her headphones 16, such a student will be not able to spend his/her instructional time so uselessly, since the selector unit 15, when in a position corresponding to the mother tongue, with the help of the cam interruptors 65 and 79-81 blocks all the keys of the given desk. On the other hand, should the student wish to record and reproduce his/her own speech in such cases when to his/her headphones there comes a phrase which has not been simplified by the pause shaper (and therefore of little use for elementary pronunciation drill), the possibility that at least one of the keys 83 will be illuminated on his/her desk will prove to be considerably smaller than in those cases when he/she makes use of the pause shaper, since, with the pause shaper in the zero position, the cam interruptors 51 and 82, adapted to block half of the keys in the terminal, operate. When necessary, the teacher can block a portion of the interruptors 65, 79-81.

In a number of cases it is more reasonable to record on the fifth, sixth and seventh tracks of the magnetic tape of the magnetic sound recorder 1 not translations into the mother tongue, but, say, the same phrases and dialogs, as recorded on the second, third and fourth tracks, but at a dictation speed. In this case the selector unit 15 will function as a selector of the speech speed.

In certain cases the selector unit 15 is reasonable to be used for selecting a portion of the graphic illustrations. In these cases on that of the holders 47 (FIG. 5) which is driven by the shaft of the selector unit 15, a non-transparent disk is placed provided with appropriately shaped slits.

The automatic shaper of written translations can also be used to shape pictures illustrating the oral text being synthesized.

In some cases the fifth, sixth and seventh tracks of the magnetic tape are expedient to be used for storing the same text as on the second, third and fourth tracks but with a few seconds delay and spoken by another speaker (e.g., a male voice on the second, third and fourth tracks, and the same text spoken in a female voice and with a few seconds delay performance, on the fifth, sixth and seventh tracks). If the pause shaper is set to a position such that it passes not more than a half of the commands, and the selector unit 15 is set to a position in which it associates with the acoustic output unit 16 both phrase shapers 13 and 14 simultaneously, each word combination selected by the student will be cyclically repeated in his/her headphones twice as often in the female and male voice. The cam interruptor 50 breaks the output circuit of the second phrase shaper in those positions of the pause shaper, in which the concurrent listening to the both speakers is impossible (that is, when the pauses are too short). If the selector unit is in a position in which it associates with the acoustic output unit 16 the both phrase shapers simultaneously the contacts of the cam interruptor 64 break. When the abovedescribed mode is not required, when the program is to be changed, that is, when the magnetic tape in the magnetic sound recorder and graphic information carriers in the students' terminals are replaced, the interruptor 64 is shunted with the help of the toggle switch 66.

The replaceable stock of audio-visual frames (without taking into account numerous modifications of each particular frame with the help of the pause shaper and the selector unit 15) in the above considered example comprised only 243 items. However, should use be made of, say, a 20 track magnetic tape instead of an eleven-track one S=6, the number of the wafer switches being increased by at least three as it is envisaged in FIG. 7, wherein two pairs of the wafer switch control handles 41 are indicated, the replaceable stock of frames will number millions of items, while the access time for any of these frames from any of the concurrently operating terminals will not be increased, amounting to a few seconds. The stock of audio-visual frames can be replaced within a few minutes.

With a sufficiently great number of terminals the cost of the herein-disclosed installation per individual student will practically equal that of one terminal. These terminals are less expensive than the presently employed individual magnetic sound recorders, the pedagogical possibilities offered by the terminals of the invention being incomparably wider.

Note should be made of the fact that the form of embodiment of the invention described above and shown in the drawings is one of possible variants of the invention. Members described hereinabove can be replaced by equivalent ones solving identical problems. For instance, the above mentioned term "screen" covers such equivalents of the screen as the aperture in the control desk lid for exposing information by way of brightening (without employing a projector), the above aperture in combination with a concave mirror or lens etc. Furtheron, mentioned above in the disclosure and referred to below in the claims the phrase "changeable non-transparent slitted film strip driven by the pause shaper" covers as equivalents a film strip actuated from the spindle of the rotary switch or a number of films overlapping one another and actuated when the position of respective keys are changed, etc. Analogously, a relay serves an equivalent of the breaker controlled by a cam provided on the shaft of the pause shaper. Respective contacts of the keys of pause shapers etc. are connected in parallel to the winding of said relay. While the term "an auxiliary multichannel magnetic sound recorder with a magnetic tape look for recording and reproducing the students' speech" covers, in particular, the tape recorders in which three magnetic heads are arranged in close proximity to each other along each track of the tape loop, the first of these heads continuously operates for reproduction, the second continuously demagnetizes and the third head continuously records, and each of the heads for reproduction and recording can, via a respective amplifier and cyclic switch be actuated at the beginning of each turn of the magnetic tape, and commutate with the pair of output terminals."

What is claimed is:

1. A machine for teaching foreign languages, comprising: a master multichannel magnetic sound recorder with a magnetic tape loop which stores prerecorded fragments of speech and control signals; students' terminals adapted to be connected to the channels of said sound recorder to synthesize various phrases from the pre-recorded fragments of speech; a phrase shaper in each of the aforesaid terminals, comprising multiple switches; a pause shaper in each of the abovesaid terminals to substitute pauses for various combinations of the fragments of a phrase, said pause shaper being connected to said phrase shaper; an acoustic output unit provided in each of the abovementioned terminals for listening to the automatically synthesized oral speech.

2. A machine as claimed in claim I, wherein each of the above-said terminals comprises a unit for automatic shaping of written translation of the speech being synthesized, said unit being connected to said pause shaper and said phrase shaper.

3. A machine as claimed in claim 2, wherein each of the abovementioned terminals has a number of phrase shapers connected to one another, and a selector unit of said phrase shapers connected to said unit for shaping written translations.

4. A machine as claimed in claim 3, comprising multiple switches of said pause shaper in a quantity to correspond to the number of the phrase shapers, each of said switches being connected to the respective said phrase shaper and being mechanically linked to each other; a cam interruptor of said switches of the pause shaper, said cam interrupter being connected to the output of any of the aforesaid phrase shapers; another cam interrupter interconnected with said selector unit and coupled in parallel with the output of the same abovesaid phrase shaper, whereto the aforementioned former cam interrupter is connected, said selector unit being made as a multiple switch capable of communicating with said acoustic output unit two of the abovementioned phrase shapers at a time.

5. A machine as claimed in claim 2, wherein the unit for shaping written translations of the oral speech being synthesized, comprises a changeable non-transparent slitted film strip driven by said pause shaper; coaxial bushings driven by the shafts of said switches of the phrase shaper and of the selector unit; attachments arranged stepwise on said coaxial bushings; changeable transparent carriers of graphic information locked in position through the use of said attachments provided on said coaxial bushings.

6. A machine as claimed in claim 1, wherein each of the above said terminals incorporates a converter unit for visualizing the rhythm of the speech being synthesized, said converter unit being coupled to said pause shaper, to said phrase shaper and to the signal lamp of the terminal involved, the rate of operation of said signal lamp corresponding to the rhythm of the speech being synthetized, said lamp being controlled by the abovesaid control signals stored on the tape of said master magnetic sound recorder.

7. A machine as claimed in claim 6, wherein said converter for visualizing the rhythm of the speech being synthetized, comprises multiple switches adapted to connect power supply to said signal lamp and coupled to said switches of the phrase shaper, and interrupters connected to said interrupters of the phrase shaper and adapted to connect to said signal lamp said switches of said converter.

8. A machine for teaching foreign languages, comprising: a master multichannel magnetic sound recorder with a magnetic tape loop which stores pre-recorded fragments of speech and control signals; an auxiliary multichannel magnetic sound recorder with a magnetic tape loop for recording and automatic reproduction of the students' speech; students' terminals adapted to be connected to the channels of said master sound recorder to synthesize various phrases from the pre-recorded fragments of speech; keys, whereby said terminals get communicated with said auxiliary multichannel magnetic sound recorder; mechanical blocking devices of each of the aforementioned keys; signal lamps each of which is coupled to the respective abovesaid key; a phrase shaper in each of the abovesaid terminals, comprising multiple switches; a pause shaper in each of the abovesaid terminals to substitute for pauses various combinations of the fragments of a phrase, said pause shaper being coupled to said phrase shaper; a regulator of accessibility of the auxiliary multichannel magnetic sound recorder, said regulator being provided in each of the aforesaid terminals and being connected to said pause shaper; an acoustic output unit provided in each of the abovementioned terminals for audition of the automatically synthetized phrases and the students' speech.

9. A machine as claimed in claim 3, wherein said pause shaper is made as a multiple switch capable of blocking various combinations of said control signals from said master magnetic sound recorder and utilizable to control said phrase shaper.

10. A machine as claimed in claim 9, wherein said phrase shaper comprises interrupters which are adapted to communicate with said acoustic output unit said multiple switches of the phrase shaper, said switches being connected in parallel with the channels of said master magnetic sound recorder that carry the pre-recorded fragments of speech.

11. A machine as claimed in claim 10, wherein said pause shaper comprises a multiple switch to communicate said acoustic output unit with said switches of the phrase shaper, the channels of said master magnetic sound recorder which carry the speech, being all at once communicated with one of the said switches of the phrase shaper in response to a control signal from said master magnetic sound recorder.

12. A machine, as claimed in claim 8, wherein each of the students' terminals is adapted to communicate with "N" recording and reproducing channels of said auxiliary magnetic sound recorder, and each of said channels is adapted to be connected to "M" other students" terminals to form a group of terminals where $M>N$ and within which the supply circuit of said mechanical blocking device of a key and the supply circuit of said key-light signal lamp of the same key of one of the terminals are controlled by said keys corresponding to the given particular channel, from the other terminals, whereas said regulator of the said channels accessibility comprises interrupters adapted to connect said key-light lamps and said mechanical blocking devices in parallel with their respective power supply circuits, and cams which are adapted to control said interrupters, said cams being set on the shaft of said pause shaper and on the shaft of said selector unit of the terminal involved.

* * * * *

United States Patent

Levesoue et al.

[15] 3,703,603
[45] Nov. 21, 1972

[54] RUB-ON SUB-ELEMENT FOR ELECTRONIC CIRCUIT BOARD

[72] Inventors: Norman R. Levesoue; Donald E. Harper, both of Inglewood, Calif.

[73] Assignee: Circuit-Stik, Inc., Gardena, Calif.

[22] Filed: May 10, 1971

[21] Appl. No.: 141,655

[52] U.S. Cl. ..................174/68.5, 29/625, 117/227, 156/249, 317/101 B
[51] Int. Cl. ..........................H05k 1/02, H05k 3/20
[58] Field of Search................174/68.5, 117 A, 227; 317/101 B, 101 C, 101 CM; 29/625, 626; 156/249; 161/185

[56] References Cited

UNITED STATES PATENTS

3,132,204   5/1964   Giellerup........174/117 A UX
3,538,389   11/1970   Levesque et al......174/68.5 X

*Primary Examiner*—Darrell L. Clay
*Attorney*—Jessup & Beecher

[57] ABSTRACT

An electronic sub-element is provided having a particular circuit configuration, and which in conjunction with other similar sub-elements of the same or different circuit configuration, may be adhesively attached to a panel-like base member so as to constitute a printed circuit assembly. The electronic sub-element of the invention is in the form of conductive metallic particles which are adhesively attached to a carrier strip, such as plastic or wax paper, and which form a multiplicity of electrical conductors separated from one another, the particles being intermixed with adhesive material.

4 Claims, 11 Drawing Figures

PATENTED NOV 21 1972

INVENTORS:
Norman R. Levesque
Donald E. Harper

ATTORNEYS